United States Patent Office 3,520,878
Patented July 21, 1970

3,520,878
PREPARATION OF DIAZEPAM
John Brammer Petersen, Haifa, Israel, assignor to W. R. Grace & Co., New York, N.Y., a corporation of New York
No Drawing. Continuation-in-part of application Ser. No. 579,500, Sept. 15, 1966. This application Oct. 15, 1968, Ser. No. 767,838
Claims priority, application Denmark, Sept. 17, 1965, 4,783/65
Int. Cl. C07d *53/06*
U.S. Cl. 260—239.3      7 Claims

ABSTRACT OF THE DISCLOSURE

In abstract, this invention is directed to a process for preparing diazepam, comprising subjecting 2-(2-azido-N-methylacetamido) - 5 - chlorobenzophenone to reductive cyclization, and recovering the thus formed diazepam, all as recited hereinafter.

CROSS-REFERENCE TO RELATED APPLICATION

This is a continuation-in-part of my copending application Ser. No. 579,500, filed Sept. 15, 1966, and now abandoned.

BACKGROUND OF THE INVENTION

This invention is in the field of diazepam preparation. Diazepam which has the formula

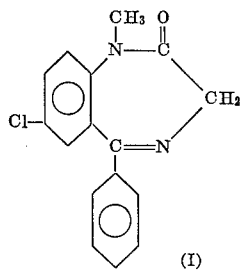

(I)

is also known as 7-chloro-1,3-dihydro-1-methyl-5-phenyl-2H-1,4-benzodiazepin-2 - one, as 7 - chloro - 1-methyl-5-phenyl-3H-1,4-benzodiazepin-2(1H)-one, and as methyl diazopinone (see page 341 of the eighth (1968) edition of "The Merck Index"). Diazepam is used as a tranquilizer and as a skeletal muscle relaxant.

Prior art methods for preparing dizepam are disclosed by Steinbach et al., J. Org. Chem., 1961, 26, 4936–41, by Bell et al., J. Org. Chem., 1962, 27, 562–6, and by U.S. Pats. Nos. 3,109,843, and 3,136,815.

SUMMARY OF THE INVENTION

In summary, this invention is directed to a process for preparing 7 - chloro - 1,3-dihydro-1-methyl-5-phenyl-2H-1,4-benzodiazepin-2-one which comprises reacting 2-(2-azido-N-methylacetamido)-5 - chlorobenzophenone with a cyclizing reducing agent selected from the group consisting of hydrogen and hydrazine hydrate in the presence of a Group VIII metal catalyst, separating, and recovering the 7 - chloro - 1,3-dihydro-1-methyl-5-phenyl-2H-1,4-benzodiazepin-2-one formed thereby.

DESCRIPTION OF PREFERRED EMBODIMENTS

In a preferred embodiment ("Embodiment A") of the process set forth in the above summary said catalyst is palladium.

In another preferred embodiment ("Embodiment B") of the process set forth in the above summary, said 2-(2-azido-N-methylacetamido)-5-chlorobenzophenone is dissolved in an inert solvent to form a first solution before being reacted with said cyclizing reducing agent.

In an especially preferred embodiment ("Embodiment C") of the process of Embodiment B, supra, the concentration of said 2-(2-azido-N-methylacetamido)-5-chlorobenzophenone in said first solution is 70–80 grams per liter of solution.

In an especially preferred embodiment ("Embodiment D") of the process of Embodiment C, supra, (a) said 2 - (2 - azido-N - methylacetamido)-5-chlorobenzophenone is reacted with said cyclizing reducing agent to form a second 7-chloro-1,3-dihydro-1-methyl-5-phenyl-2H-1,4-benzodiazepin-2-one solution;
(b) said catalyst is separated from said second solution;
(c) said 7-chloro-1,3-dihydro-1-methyl-5-phenyl-2H-1,4-benzodiazepin-2-one is separated from said second solution; and
(d) said 7-chloro-1,3-dihydro-1-methyl-5-phenyl-2H-1,4-benzodiazepin-2-one is recovered.

In an especially preferred embodiment ("Embodiment E") of the process of Embodiment D, supra, said 2-(2-azido-N-methyl-acetamido)-5-chlorobenzophenone is reacted with said cyclizing reducing agent at about 10–100° C.

In especially preferred embodiments of the process of Embodiment E, supra:

(1) Said cyclizing reducing agent is hydrogen; and said 2-(2 - azido - N - methylacetamido) - 5 - chlorobenzophenone is contacted with said hydrogen at a pressure of about 2–20 atmospheres absolute for about 0.5–10 hours; and
(2) Said cyclizing reducing agent is hydrazine (which can be supplied as hydrazine hydrate).

In another preferred embodiment ("Embodiment F") this invention is directed to 2 - (2 - azido - N - methyl-acetamido-5-chlorobenzophenone.

In another preferred embodiment ("Embodiment G") this invention is directed to a process for preparing 2-(2-azido - N - methylacetamido) - 5 - chlorobenzophenone which comprises reacting 2-methylamino-5-chlorobenzophenone with a first azido compound selected from the group consisting of azidoacetic acid and functional derivatives thereof (typical of such functional derivatives are azidoacetyl halides (including the chloride and bromide) and azidoacetic anhydride) in the presence of an inert solvent, and recovering the thus formed 2-(2-azido-N-methylacetamido)-5-chlorobenzophenone.

In an especially preferred embodiment ("Embodiment H") of the process of Embodiment G, supra, the concentration of said 2-methylamino-5-chlorobenzophenone in said inert solvent is 400–600 grams per liter of solution.

In an especially preferred embodiment ("Embodiment I") of the process of Embodiment H, supra, the inert solvent is selected from the group consisting of ketones having about 3–8 carbon atoms per molecule and being liquid at about room temperature and about atmospheric pressure and halogen substituted aromatic, aliphatic, alkaryl, and cycloaliphatic hydrocarbons having about 1–7 carbon atoms and about 1–15 halogen atoms per molecule, the halogen atoms being selected from the group consisting of fluorine, chlorine, bromine, and iodine, the halogen substituted hydrocarbons being liquid at about room temperature and about atmospheric pressure.

In an especially preferred embodiment ("Embodiment J") of the process of Embodiment H, Supra, said 2-methylamino-5-chlorobenzophenone and said azido compound are reacted at 20–60° C.

In an especially preferred embodiment ("Embodiment K") of the process of Embodiment J, supra, said first azido compound is azidoacetyl chloride.

In a preferred embodiment ("Embodiment L") this invention is directed to a process for preparing 2-(2-azido-N-methyl-acetamido)-5-chlorobenzophenone which comprises reacting a first compound having the following formula

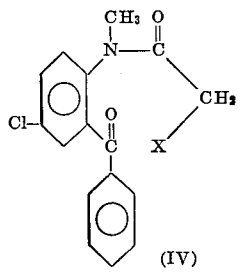

(IV)

wherein X is a member selected from the group consisting of halogen (e.g., fluorine, chlorine, bromine, and iodine) tosyl, and mesyl with a second compound of the formula MN₃ wherein M is selected from the group consisting of sodium, lithium, potassium, aluminum, and silver, and recovering the azido compound formed thereby.

In an especially preferred embodiment ("Embodiment M") of the process of Embodiment L, supra, said first compound is dissolved in an inert solvent selected from the group consisting of dimethylformamide, dimethyl sulfoxide, and mixtures thereof to form a first solution consisting essentially of said first compound dissolved in said inert solvent—said first compound being dissolved in said inert solvent when being reacted with said second compound.

In an especially preferred embodiment ("Embodiment N") of the process of Embodiment M, supra, the concentration of first compound in said first solution is about 200–300 grams per liter of solution.

In another especially preferred embodiment ("Embodiment O") of the process of Embodiment M, supra, the second compound is supplied at a rate to provide about 1–1.1 equivalents of azide ion (an equivalent of azide ion being 42.02 grams of said ion) per mole of said first compound.

In an especially preferred embodiment ("Embodiment P") of the process of Embodiment O, supra, said first compound and said second compound are reacted at about 20–60° C.

In an especially preferred embodiment ("Embodiment Q") of the process of Embodiment O, supra, said first compound is 2-(2-chloro-N-methylacetamido)-5-chlorobenzophenone and said second compound is sodium azide.

DETAILED DESCRIPTION OF THE INVENTION

It is an object of the present invention to provide an improved method for preparing diazepam.

It is another object to provide a novel chemical intermediate which can be readily converted into diazepam.

It is still another object to provide a method by which substantial yields of pharmaceutical grade diazepam can be obtained from relatively inexpensive raw materials.

These and still further objects of the present invention will become readily apparent to one skilled in the art from the following detailed description and specific examples.

Broadly, the present invention contemplates a procedure wherein a novel azido intermediate, 2-(2-azido-N-methylacetamido)-5-chlorobenzophenone having the formula

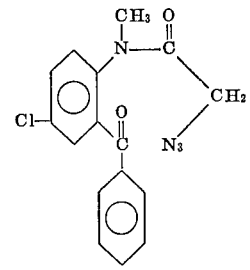

(II)

is subjected to reductive cyclization to produce diazepam.

This novel azido intermediate (II) can be prepared by either of the two methods conveniently outlined below:

(1)

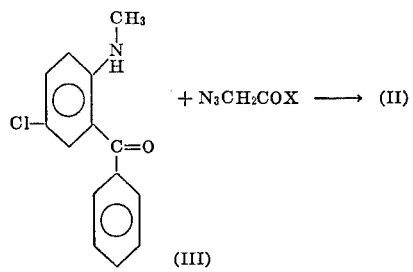

wherein X is halogen (e.g., fluorine, chlorine, bromine, or iodine, most preferably chlorine), hydroxyl, or lower alkoxy having about 1–6 carbon atoms; and (2)

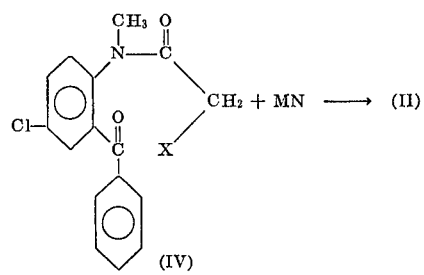

wherein X is halogen (e.g., fluorine, chlorine, bromine, or iodine, most preferably chlorine), tosyl or mesyl and M is sodium, lithium, potassium, aluminum, or silver.

More specifically, I have found that substantial yields of diazepam, the diazepam having a high degree of purity, can be readily obtained by reacting 2-(2-azido-N-methylacetamido)-5-chlorobenzophenone with hydrogen in the presence of Raney nickel or a Group VIII noble metal reducing catalyst, preferably palladium or platinum, at about 10–100° C. in the presence of an inert solvent.

I have also found that substantial yields of diazepam, the diazepam having a high degree of purity, can be readily obtained by reacting 2-(2-azido-N-methylacetamido)-5-chlorobenzophenone with hydrazine in the presence of a Group VIII noble metal reducing catalyst, preferably palladium at a temperature of about 10° to 100° C. in the presence of an inert solvent.

The reaction of this invention can be represented (or outlined) as follows:

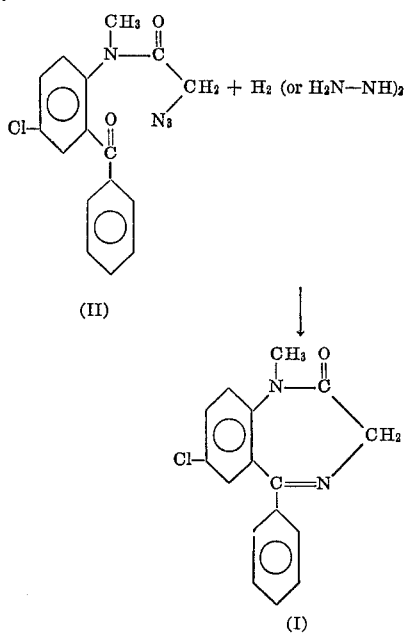

The reductive cyclization step can be conveniently carried out using molecular hydrogen at a pressure of about 1.5–50 (preferably about 2–10) atmospheres absolute and a temperature of about 9 to 100° C. (preferably about 10–50° C.). The reductive cyclization is carried out in the presence of a Group VIII metal catalyst and a first inert solvent. First inert solvents excellently adapted for use in this step of my process include alkanols having about 1–8 carbon atoms, dialkyl ethers having about 4–10 carbon atoms, and dioxane. Using temperatures and pressures generally indicated above, it has been found that from about 0.5 to 10, generally about 3 to 6 hours is required to substantially complete the desired reductive cyclization step.

It has also been found that hydrazine (e.g., hydrazine hydrate) in the presence of a Group VIII noble metal catalyst, can be used instead of catalytic hydrogenation to produce the desired reduction (reductive cyclization) step. When catalyzed hydrazine hydrate is used as the reduction agent, I prefer to use approximately 1 part by weight of hydrazine hydrate and about 10 parts by weight of the azido intermediate (II) in the presence of a first inert solvent. (Preferably an inert solvent selected from the list of first inert solvents in the preceding paragraph.) However, excellent results can be obtained when the weight ratio of hydrazine hydrate to (II) is about 1:5–15. The reductive cyclization with the hydrazine hydrate is conducted at a temperature of about 9–100° C.—the time required for completion of the reaction (cyclization) being about 0.4–10 hours (preferably about 0.5–2.0 hours). Where conducting the reductive cyclization with hydrazine at a temperature above the normal boiling point of the solvent (i.e., at a temperature above which the solvent would boil at atmospheric pressure), I prefer to conduct the reductive cyclization under sufficient pressure (e.g., ca. 2–50 atmospheres absolute) to prevent the solvent from boiling. Alternatively, when conducting the reductive cyclization with hydrazine at the boiling point of the liquid phase of the reaction mixture, the reductive cyclization can be conducted in a reaction zone provided with a reflux condenser, whereby solvent vapor is condensed and returned to said zone. Excellent results have been obtained when conducting the reductive cyclization of 2-(2-azido-N-methylacetamido)-5-chlorobenzophenone at about 10–100° C.; however, I prefer to conduct such reductive cyclization at about 20–60° C., especially at about 35–45° C.

The reductive cyclization step is, as noted supra, catalyzed by a Group VIII metal catalyst such as palladium, platinum, rhodium, and ruthenium and by Raney nickel. The nickel or noble metal catalyst is preferably placed on an inert carrier support such as carbon, alumina, titania, silica, or the like in amounts ranging from about 1–40 (preferably about 4–10) parts by weight per 100 parts by weight of the support. Generally, palladium, most preferably palladium mounted on a carbon support, provides excellent results, and it has been found that about one part by weight of supported catalyst per 5 to 30 (preferably 15–25) parts by weight of azido intermediate (II) being cyclized will produce very excellent results.

The reductive cyclization is preferably carried out in a first inert solvent such as dioxane and lower alkanols having about 1–8 (more preferably about 1–6) carbon atoms—especially ethanol. Generally, from about 10 to 20 (preferably about 10–15) parts by weight of inert solvent are used per part by weight of the azido intermediate (II) being reacted (i.e., undergoing reductive cyclization).

Subsequent to the reductive cyclization step the diazepam product and first inert solvent are separated from the catalyst (e.g., by filtration, centrifugation or decantation) and the diazepam is separated from the first inert solvent (e.g., by evaporating said solvent from the diazepam—preferably using a temperature of about 60–100° C. with reduced pressure). The separated diazepam can be further purified by dissolving it in a second inert solvent e.g., a ketone having about 3–8 carbon atoms, a halogen substituted aromatic, aliphatic, alkaryl, or aromatic, or cycloaliphatic hydrocarbon having about 1–7 carbon atoms and about 1–15 halogen atoms per molecule, the halogen atoms being selected from the group consisting of fluorine, chlorine, bromine, iodine, and mixtures thereof, and an ether having about 4–10 carbon atoms per molecule, and preferably a lower alcohol having about 2–8 carbon atoms—especially ethanol or 2-propanol, the inert solvent being liquid at about 25–30° C. and 1 atmosphere absolute pressure, and crystallizing it (the dissolved diazepam) therefrom.

Alternatively, in a fully equivalent procedure, the first inert solvent can be evaporated from the mixture of diazepam and catalyst, the diazepam can then be dissolved in the second inert solvent, and the resulting solution separated from the catalyst before crystallizing the diazepam from such second solvent.

I have found that further purification of the crude diazepam made by reductive cyclization of (II) according to the process of my invention can be achieved by contacting a solution of the reaction product (crude diazepam) in the aforesaid second inert solvent, especially a lower alkanol having 1–6 carbon atoms and preferably ethanol or 2-propanol (the resulting solution containing about 200–300 (preferably about 240–270) grams of diazepam per liter of solution) with activated carbon—using about 2–10 (preferably about 4–6) grams of said carbon per 100 grams of crude diazepam, separating the solution from the carbon (e.g., by decantation, centrifugation, or filtration), and separating and recovering the diazepam from the second inert solvent, by crystallizing the diazepam from the second inert solvent (e.g., by cooling) and filtering, decanting, or centrifuging the resulting mixture to separate and recover the diazepam therefrom. Alternatively, in a less desirable embodiment, after separating the solution from the carbon, the second solvent can be evaporated or distilled (preferably under reduced pressure) to separate it (the solvent) from the diazepam which is then recovered. I have found that about 2–10 (preferably about 4–6) parts of activated carbon per 100 parts of the crude diazepam product will yield purified diazepam of excellent quality. The resulting purified diazepam product is a white crystalline solid which possesses a melting point in the range of 131.4 to 132.6° C.

The diazepam product obtained by the present synthesis possesses utility as a tranquilizer in that it is useful in the control of anxiety and tension states and aids in the relief of muscle spasm of cerebral palsy and athetosis.

The azido compound which constitutes the starting material for the reductive cyclization step, namely 2-(2-azido-N-methylacetamido) - 5 - chlorobenzophenone, (II) supra, has not hitherto been prepared; hence, it constitutes another feature of my invention. I have found that 2-(2-azido-N-methylacetamido) - 5 - chlorobenzophenone can be prepared by either of two general methods which are described below:

*First general method.*—2-methylamino-5-chlorobenzophenone (III), supra, is dissolved in a first inert solvent such as chloroform, ketones having about 3–8 carbon atoms, halogen substituted aromatic, aliphatic, alkaryl, and cycloaliphatic hydrocarbons having about 1–7 carbon atoms and about 1–15 halogen atoms per molecule, the halogen atoms being selected from the group consisting of fluorine, chlorine, bromine, iodine, and mixtures thereof, and ethers having about 4–10 carbon atoms per molecule, the inert solvent being liquid at about 25–30° C. and 1 atmosphere absolute pressure, the concentration of (III) in the resulting solution being about 200–800 (preferably about 400–600) grams of solute, (III), per liter of solution. The solute is then reacted with a first agent capable of introducing an $N_3$—$CH_2$—$CO$— group onto the nitrogen atom of (III), the first agent being, for example, azidoacetic acid, or a functional derivative thereof such as an azidoacetyl halide, preferably azidoacetyl chloride ($N_3CH_2COCl$) or azidoacetic anhydride. The first agent is supplied at a rate of about 1–1.5 (preferably about 1–1.1) equivalents of azide (—$N_3$) per mole of (III), the first agent being reacted with the (III) at about 20–60° C. (preferably about 40–50° C.). After mixing the solution of (III) and the first agent, the resulting mixture is allowed to stand (preferably with agitation) for about 0.5–4.0 (preferably about 1–2 hours), at about 20–60° C. (preferably about 40–50° C.) before separating the crude product, (II), supra, from the mother liquor in which it (the crude (II)) is formed. A preferred method for separating crude (II) from such mother liquor comprises evaporating (or distilling) the mother liquor from the (II) at about 40–80° C. (preferably about 50–60° C.) under reduced pressure (e.g., ca. 10–500 millimeters of mercury absolute).

If desired, the separate crude (II), can be purified, suitably by dissolving it (the crude (II)) in a heated (e.g., ca. 50–80° C., preferably ca. 70–80° C.) second inert solvent (the temperature selected being below the boiling point of the solvent) and crystallizing the dissolved (II) therefrom (e.g., by cooling the thus formed solution of (II) to about $+10$ to $-20°$ C. (preferably about 0 to $-10°$ C.), the temperature selected being above the freezing point of the solvent). Solvents excellently suited for this purpose include lower alkanols having about 1–8 (preferably about 2–6) carbon atoms (ethanol is especially preferred), ketones having about 3–8 carbon atoms, and alkyl ethers having about 6–8 carbon atoms. The thus crystallized (II) can be separated (e.g., by centrifugation, decantation, or filtration) from the mother liquor (second inert solvent plus reaction by-products, etc.) from which it (the II)) was crystallized. The separated (II) can be washed with a fresh portion of a third inert solvent—preferably a cooled (e.g., ca. $-20$ to $+10°$ C., preferably ca. $-10$ to $0°$ C.) third inert solvent and recovered or dried (i.e., substantially freed of solvent) at about 40–80° C. (preferably about 50–60° C.) and recovered. (The third inert solvent can be a solvent selected from the above-listed second inert solvents; the third inert solvent must be liquid at the lowest temperature at which it (the third inert solvent) is used to wash the separated (II).) The conversion (one pass yield) is substantially quantitative, being about 97% of theory or higher.

*Second general method.*—A compound having the formula:

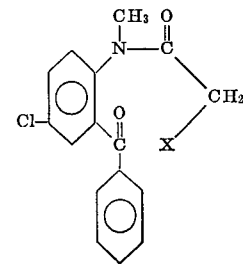

wherein X is halogen, tosyl, or mesyl is dissolved in a first inert solvent, solvents excellently adapted for this purpose are dimethylformamide, dimethyl sulfoxide, and mixtures thereof. The dissolved (IV) is then reacted with a second agent, the second agent being a salt of hydrazoic acid, especially an alkali metal (preferably sodium) azide, or aluminum azide, or silver azide. The second agent is supplied at a rate to provide about 1–1.5 (preferably 1–1.1) equivalents of azide ion (by 1 equivalent of azide ion ($N_3^-$) is meant 42.02 g. of said ion) per mole of (IV), the second agent being reacted with the (IV) at about 40–80° C. (preferably about 60–70° C.). After mixing the solution of (IV) and the second reagent, the resulting mixture is allowed to stand (preferably with agitation) for about 0.5–2 hours (preferably about 0.5–1 hour) at the aforesaid temperature before separating the crude product (crude II)) which is formed from a mother liquor from which the crude product precipitates. Precipitation or crystallization of crude (II) can be facilitated by: (a) Adding water and cooling the resulting mixture in which the crude (II) was formed to a temperature above the freezing point of said mixture and generally below $+25°$ C. and above $-20°$ C. (In this respect, it should be noted that substantially pure dimethyl sulfoxide freezes at about $+19°$ C. and substantially pure dimethylformamide freezes at about $-61°$ C.)

The precipitated crude (II) can be separated from the mother liquor by filtration; centrifugation, or decantation.

If desired, the separated crude (II) can be further purified, for example, by the procedure used to purify crude (II) prepared by the "First General Method" supra.

The conversion (one pass yield) of (II) obtained when (II) is prepared by the "Second General Method" is excellent, being in excess of 95% of theory.

Purified (II) prepared by either of the two above-discussed general methods melts within the range of about 111–113° C.

Having described the broad essential aspects of the present invention the following examples are given to illustrate specific embodiments thereof.

Example I

2 - (2 - azido - N-methylacetamido)-5-chlorobenzophenone (3.29 g.) in the form of crystals melting at 111–113° C. was dissolved in dioxane (30 ml.) and then 0.20 g. of a 5% palladium-on-carbon catalyst was added. The mixture was agitated for 6 hours in the presence of excess hydrogen at 3 atmospheres absolute pressure. The catalyst was then removed by filtration and the resulting pale yellow solution was evaporated on a water bath at 35° C. to yield a syrup.

The syrup thus obtained was dissolved in ethanol (15 ml.) and the resulting solution cooled to $-10°$ C. The residue which formed on cooling was filtered off, washed with cooled (ca. $-10°$ C.) ethanol, (4 ml.) and dried in a drying cupboard at 60° C. 7-chloro - 1,3 - dihydro-1-methyl - 5 - phenyl - 2H - 1,4 - benzodiazepin-2-one (2.10 g.) was obtained in the form of crystals melting at 128–130° C. (74% conversion). A sample, recrystallized from ethanol to a constant melting point of 131.4–132.6°, analyzed as follows: Calculated for $C_{16}H_{13}ClN_2O$ (percent): C, 67.4; H, 4.6; Cl, 12.5; N, 9.9. Found (percent): C, 67.5; H, 4.8; Cl, 12.5; N, 10.0 (Dumas). The identity of the product was further confirmed by infra-red spectroscopy and by mixed melting point observations with an authentic sample.

Example II

A solution of hydrazine hydrate (3.13 g.) in ethanol (100 ml.) was added in one portion to a stirred suspension of 2-(2-azido-N-methylacetamido) - 5 - chlorobenzophenone (32.88 g.) and a 5% palladium-on-carbon catalyst (2 g.) in ethanol (300 ml.) at room tempearture. The reaction mixture was heated to 40° C. and kept at this temperature for one hour while agitating the mixture slowly. Brisk evolution of gas occurred and the exothermic reaction made cooling necessary. After one hour the mixture was filtered to remove the catalyst; the flask and filter cake (catalyst) were washed with ethanol (passing the wash alcohol from the flask through the filter) and the resulting yellow solution (combined filtrate and wash alcohol) was evapoarted under vacuum (20 millimeters of mercury absolute pressure) on a water bath maintained at 100° C. The resulting yellow oily residue was dissolved in 2-propanol (100 ml.) and cooled to −20° C., thereby causing the formation of a crystalline product which was filtered off and washed with 2-propanol (25 ml.) at −20° C. After drying in an oven at 80° C., 25.80 g. of substantially dry (i.e., solvent free) 7 - chloro-1,3-dihydro-1-methyl-5-phenyl-2H-1,4-benzodiazepin-2-one product was obtained; this result corresponds to a conversion of 91% of theory. The melting point of this product was 130.2–131.5° C. (Hershberg apparatus corrected). The product had a slight yellow color which was removed by treatment with activated carbon by the general procedure of Example V, infra.

Example III

Azidoacetyl chloride (7.17 g.) was poured into a solution of 5-chloro-2-methylaminobenzophenone (12.28 g.) in chloroform (25 ml.) while stirring. The temperature of the mixture increased from about 20° C. to about 45° C. and hydrogen chloride was evolved. The mixture was allowed to stand for one hour at 40–50° C. and was then evaporated at reduced pressure (10 millimeters of mercury absolute pressure) on a water bath at 60° C. The resulting hot, oily residue was dissolved in ethanol (25 ml.) and cooled to −10° C. The crystalline product which formed when the ethanol solution was cooled was removed by filtration, and washed with ethanol (10 ml. cooled to −10° C.). The washed crystalline product was dried in a drying cupboard at 60° C. Crude 2-(2-azido-N-methylacetamido)-5-chlorobenzophenone product (16.10 g.) was obtained in the form of white crystals of melting at 111–113° C. The conversion was 98% theory.

A sample, of the crude product on recrystallization from ethanol to a constant melting point (112–113° C.), analyzed as follows: Calculated for $C_{16}H_{14}ClN_4O_2$ (percent): C, 58.5; H, 3.9; Cl, 10.8; N, 17.0. Found (percent): C, 58.3; H, 4.0; Cl, 11.0; N, 17.3 (Dumas).

Example IV

In a first run, sodium azide (1.43 g.) was added to a stirred solution of 2-(2-chloro-N-methylacetamido-5-chlorobenzophenone (6.44 g.) in dimethylformamide (25 ml.). The temperature of the reaction mixture rose and was brought to 60° C. by additional heating. After stirring at this temperature for 30 minutes, cold water (30 ml.) was added dropwise to the warm reaction mixture under vigorous agitation. Stirring was continued until the mixture cooled to room temperature at which time the crystalline precipitate which formed was collected by filtration. The product was recrystallized from ethanol (10 ml.) filtered, washed with ethanol (2 ml.) at 0° C. and dried in an oven at 80° C. 2-(2-azido-N-methylacetamido)-5-chlorobenzophenone (6.30 g.) was obtained as white crystals melting at 111.5–113° C. The conversion was 98% of theory.

In a second run the general procedure of the first run was repeated; however, in the second run the dimethylformamide solvent of the first run was replaced with dimethyl sulfoxide. Conversion in the second run was 80% of theory. The product melted at 111.5–113° C.

Example V

Crude diazepam (25.80 g.) obtained by way of Example I was dissolved in hot (boiling) 2-propanol (103 ml.) and cooled slowly to −20° C. Light yellow crystalline diazepam was isolated by filtration and washed with 2-propanol (26 ml., −20° C.). The wet cake was dissolved in boiling 2-propanol and the resulting solution was stirred for five minutes with activated carbon (1.25 g., Nort SX Ultra) at 75–80° C. (Boiling must be avoided because the activated carbon in this instance is most effective just below the boiling point of the solution.) The carbon was removed by filtering the hot solution through asbestos fiber, and white diazepam with a yellow tinge was isolated as described above.

On repetition of the carbon treatment and drying in an oven at 80° C., an 88% recovery of white crystals of diazepam melting at 131.4–132.6° C. (Hershberg app. corr.) resulted.

Example VI 2-(2-azido-N-methylacetamido)-5-chlorobenzophenone (3.29 g.) was dissolved in dioxane (30 ml.) A 5% platinum-on-carbon catalyst (0.20 g.) was added and the mixture was shaken at room tempearture for 6 hours in the presence of excess hydrogen at 3 atmospheres pressure. The catalyst was removed by filtration and the resulting yellowish solution evaporated on a water bath (100° C.) under reduced pressure (10 millimeters of mercury absolute pressure). The resulting syrup was dissolved in 2-propanol (10 ml.) and cooled slowly to −10° C. A crystalline precipitate formed and was filtered off, washed with 2-propanol (2.5 ml.) at −10° C. and dried in an oven at 60° C. Slightly yellow 7-chloro-1,3-dihydro-1-methyl-5-phenyl-2H-1,4-benzodiazepin-2-one (1.85).

The above examples clearly indicate that substantial yields of pure diazepam may be readily obtained using the teachings of the present invention.

As used herein the term "percent," means parts per hundred by weight unless otherwise defined where used, except that "percent yield" and "percent conversion" (one pass yield) are obviously dimensionless numbers. The term parts, as used herein, means parts by weight unless otherwise defined where used.

I claim:

1. A process for preparing 7-chloro - 1,3-dihydro-1-methyl - 5-phenyl - 2H-1,4-benzodiazepin - 2-one which comprises reacting 2-(2-azido-N-methylacetamido) - 5-chlorobenzophenone in an inert solvent selected from the group consisting of alkanols having about 1–8 carbon atoms, dialkyl ethers having about 4–10 carbon atoms, and dioxane at about 10–100° C. with a cyclizing reducing agent selected from the group consisting of hydrogen and hydrazine hydrate in the presence of a Group VIII metal catalyst, separating, and recovering the 7-chloro-1,3-dihydro-1-methyl - 5-phenyl - 2H-1,4-benzodiazepin-2-one formed thereby.

2. A process for preparing 7-chloro - 1,3-dihydro - 1-methyl - 5-phenyl - 2H-1,4-benzodiazepin - 2-one which comprises;
   (a) reacting for about 3–6 hours at about 20–60° C. a first solution of 2-(2-azido-N-methylacetamido) - 5-chlorobenzophenone in an inert solvent selected from the group consisting of alkanols having about 1–8 carbon atoms, dialkyl ethers having about 4–10 carbon atoms, and dioxane with a cyclizing reducing agent selected from the group consisting of hydrogen and hydrazine hydrate in the presence of a Group VIII metal catalyst to form a second 7-chloro-1,3-dihydro - 1-methyl-5-phenyl - 2H-1,4-benzodiazepin-2-one solution in said inert solvent;

(b) separating said catalyst from said second solution;
(c) separating said 7-chloro - 1,3-dihydro - 1-methyl-5-phenyl - 2H-1,4-benzodiazepin - 2-one from said inert solvent; and
(d) recovering said 7-chloro-1,3-dihydro - 1-methyl-5-phenyl-2H-1,4-benzodiazepin-2-one.

3. The process of claim 1 wherein said catalyst is palladium.

4. The process of claim 1 wherein said 2-(2-azido-N-methylacetamido)-5-chlorobenzophenone is dissolved in said inert solvent to form a first solution before being reacted with said cyclizing reducing agent.

5. The process of claim 4, wherein:
(a) said 2-(2-azido-N-methylacetamido) - 5-chlorobenzophenone is reacted with said cyclizing reducing agent to form a second 7-chloro - 1,3-dihydro-1-methyl-5-phenyl - 2H-1,4-benzodiazepin-2-one solution;
(b) said catalyst is separated from said second solution;
(c) said 7-chloro - 1,3-dihydro - 1-methyl-5-phenyl-2H-1,4-benzodiazepin-2-one is separated from said solvent; and
(d) said 7-chloro - 1,3-dihydro - 1-methyl-5-phenyl-2H-1,4-benzodiazepin-2-one is recovered.

6. The process of claim 1, wherein:
(a) said cyclizing reducing agent is hydrogen; and
(b) said 2-(2-azido-N-methylacetamido) - 5-chlorobenzophenone is contacted with said hydrogen at a pressure of about 2–20 atmospheres absolute for about 0.5–10 hours.

7. The process of claim 1 wherein said cyclizing reducing agent is hydrazine.

References Cited

UNITED STATES PATENTS

| | | | |
|---|---|---|---|
| 3,030,388 | 4/1962 | Moore et al. | 260—349 |
| 3,341,592 | 9/1967 | Sternbach et al. | 260—239.3 |

OTHER REFERENCES

Heslop and Robinson: "Inorganic Chemistry," pages 398–9 (Elsevier) (1960).

HENRY R. JILES, Primary Examiner

R. T. BOND, Assistant Examiner

U.S. Cl. X.R.

260—349, 999